Apr. 10, 1923.

J. S. ESLICK 1,451,210

MOTOR CYCLE SUPPORT

Filed Nov. 28, 1921

INVENTOR

Joseph S. Eslick

BY John A. Naismith

ATTORNEY

Apr. 10, 1923.
J. S. ESLICK
1,451,210
MOTOR CYCLE SUPPORT
Filed Nov. 28, 1921
2 sheets-sheet 2
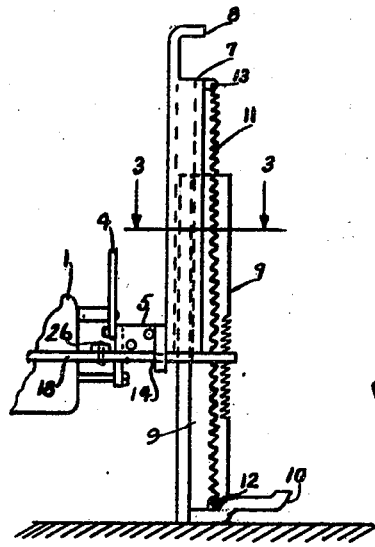
FIGURE 2
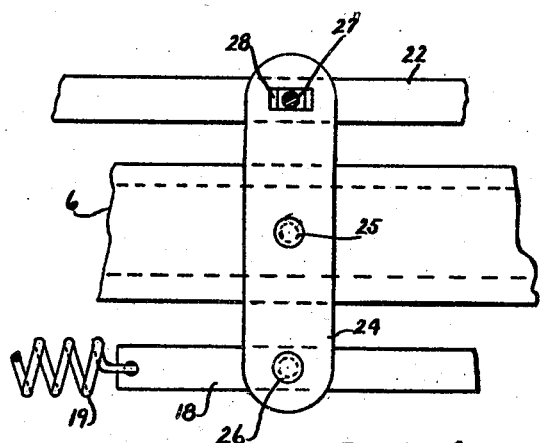
FIGURE 4
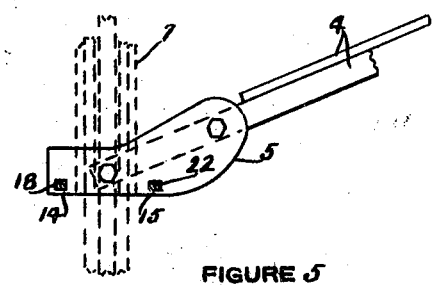
FIGURE 5
FIGURE 3
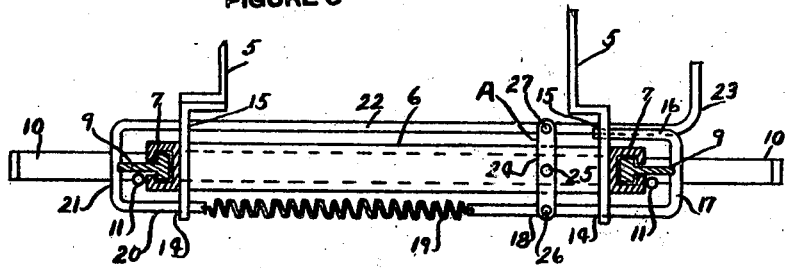
INVENTOR
Joseph S. Eslick
BY John A. Naismith
ATTORNEY Patented Apr. 10, 1923.

1,451,210

UNITED STATES PATENT OFFICE.

JOSEPH S. ESLICK, OF SAN JOSE, CALIFORNIA.

MOTOR-CYCLE SUPPORT.

Application filed November 28, 1921. Serial No. 518,387.

*To all whom it may concern:*

Be it known that I, JOSEPH S. ESLICK, a citizen of the United States, and resident of San Jose, in the county of Santa Clara and State of California, have invented certain new and useful Improvements in Motor-Cycle Supports, of which the following is a specification.

It is the object of my invention to provide a mechanism mountable upon a motorcycle that may be quickly and easily moved into position for supporting the motorcycle in an upright position. It is a further object to provide a device of the character indicated that will support the motorcycle in an upright position upon uneven ground, and that can be readily operated from the driver's seat. It is a further object of my invention to provide a device of the character indicated that will support the motorcycle without requiring the raising of either wheel from the ground.

In the drawing,—

Figure 2 is a side elevation of one end of the device including one supporting leg.

Figure 3 is a horizontal section through the whole device at 3—3 of Figure 2.

Figure 4 is an enlarged plan view of the part "A" in Figure 3.

Figure 5 is a detail illustration showing the method of mounting the device on a motorcycle.

Figure 1:
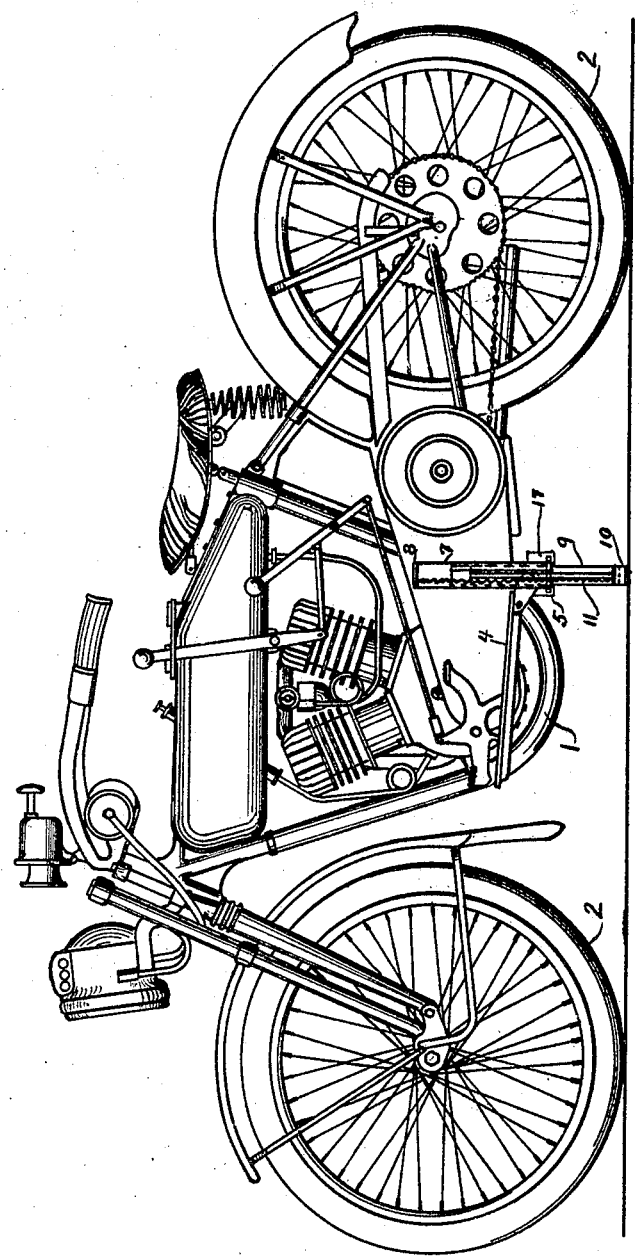
Figure 1 is a side elevation of a motorcycle equipped with my improved support.

Referring more particularly to the drawing, 1 indicates a motorcycle including wheels 2 and foot boards 4. Secured to each foot board 4 is a plate 5 supporting a bar 6 arranged transversely of the machine and passing thereunder.

At each end of bar 6 and secured rigidly thereto in a vertical position is a guide 7 C shaped, in transverse cross-section and having a stop 8 at its upper end and a rack 9 mounted to slide vertically therein. Rack 9 has an outwardly projecting foot 10 at its lower end and a spring 11 is attached to the lower end of rack 9 as at 12 and the upper end of guide 7 as at 13.

At each end of bar 6 and mounted rigidly thereon are bearings 14 and 15 respectively. In bearing 15 is arranged a bar having one short end 16 engaging the bearing, a transverse section 17 engaging rack 9 and a longer end 18 engaging bearing 14 and having a spring 19 connected thereto. At 20 is the short end of another bar attached to spring 19 and engaging bearing 14, the said bar extending transversely as at 21 to engage the other rack 9 and then back through bearings 15 as at 22 and curved forwardly as at 23.

A cross bar is shown at 24 pivotally mounted on bar 6 as at 25 and pivotally connected to bar portions 18 and 22 as at 26 and 27 respectively, the latter being a sliding pivotal connection through the medium of slot 28 in bar 24 for the purpose hereinafter set forth.

Assuming the device to be securely mounted on a motorcycle as described, the springs 11 normally holding the rack 9 with their foot pieces 10 in an elevated position. Upon stopping the machine the driver forces first one rack 9 and then the other downwardly against the tension of springs 11 until the foot pieces 10 rest upon the ground, the spring 19 automatically causing the bar portions 17 and 21 to engage their respective racks 9 and hold them in extended position. These foot pieces 10—10 being spaced apart the full width of the machine they support it firmly on both sides and effectually maintain it in an upright position. Since each rack operates independently of the other they may be extended unequal distances as the nature of the ground may require to maintain the machine in an upright position.

To release the machine the driver merely takes his place upon the seat and strikes arm 23 with his foot. This movement disengages bar portion 21 from its rack 9 and through the medium of pivotal cross bar 24, at the same time disengages bar portion 17 from the adjacent rack 9. The released bars are immediately drawn upwardly to an inoperative position by their respective springs 11. The slot 28 permits some play between bars 24 and 22 whereby easy and positive action of the parts is secured.

It may now be readily seen that with a support of this nature the machine may be released or secured by the driver when in the driving position; it may be readily maintained in a vertical position on uneven ground; the device affords a simple effective support means easily attached to a motorcycle; and the machine may be effectually supported in an upright position without removing either wheel from the ground.

It is to be understood, of course, that while I have herein shown and described one particular embodiment of my invention, that changes in form and construction may be made within the scope of the appended claims.

I claim:—

1. A motorcycle support comprising guides adapted to be vertically mounted upon each side thereof, a leg member slidably mounted in each guide, a resilient connection between each leg and guide, means for locking each leg in a given position with relation to its guide, and foot actuated means for simultaneously unlocking said leg members.

2. A motorcycle support comprising a supporting bar adapted to be arranged transversely thereto intermediate the front and rear wheels a vertical guide arranged on each end of said bar, a ratchet leg member slidably mounted in each guide, a resilient connection between each guide and leg, resiliently connected bars engageable with said ratchet legs, and means whereby the disengaging of one bar from one ratchet automatically disengages the other bar from the other ratchet.

3. A motor cycle support comprising a supporting bar adapted to be arranged transversely thereto intermediate the front and rear wheels, a vertical guide arranged on each end of said bar, a leg member slidably mounted in each guide, a resilient connection between each guide and leg, resiliently connected bars engaging said legs, and means connecting said bars whereby a movement of one bar in one direction will move the other bar in the opposite direction.

4. A motor cycle support comprising a supporting bar adapted to be arranged transversely thereto intermediate the front and rear wheels, a vertical guide arranged on each end of said bar, a leg member slidably mounted in each guide, a resilient connection between each guide and leg, resiliently connected bars engaging said legs, and a cross bar pivotally attached to each of said last mentioned bars and to said supporting bar.

JOSEPH S. ESLICK.